US012427779B2

(12) United States Patent
Kawakita et al.

(10) Patent No.: US 12,427,779 B2
(45) Date of Patent: Sep. 30, 2025

(54) LIQUID SUPPLY SYSTEM, CONTROL METHOD, NON-TRANSITORY COMPUTER-READABLE MEDIUM STORING COMPUTER-READABLE INSTRUCTIONS, AND LIQUID SUPPLY DEVICE

(71) Applicant: BROTHER KOGYO KABUSHIKI KAISHA, Nagoya (JP)

(72) Inventors: Akihiro Kawakita, Nagoya (JP); Hisaaki Yoshimoto, Nukata (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 169 days.

(21) Appl. No.: 18/520,887

(22) Filed: Nov. 28, 2023

(65) Prior Publication Data

US 2024/0173990 A1 May 30, 2024

(51) Int. Cl.
*B41J 2/175* (2006.01)

(52) U.S. Cl.
CPC ....... *B41J 2/17566* (2013.01); *B41J 2/17513* (2013.01); *B41J 2/17523* (2013.01); *B41J 2/17596* (2013.01)

(58) Field of Classification Search
CPC .... B41J 2/175; B41J 2/17506; B41J 2/17509; B41J 2/17513; B41J 2/17523; B41J 2/17566; B41J 2/17596; B41J 2/18
See application file for complete search history.

(56) References Cited

U.S. PATENT DOCUMENTS

| | | | | |
|---|---|---|---|---|
| 10,632,758 | B2 * | 4/2020 | Kosuge | B41J 29/02 |
| 2011/0285767 | A1 * | 11/2011 | Tanaka | B41J 2/175 347/6 |
| 2013/0220478 | A1 * | 8/2013 | Kasahara | B65B 3/04 141/2 |

FOREIGN PATENT DOCUMENTS

| | | |
|---|---|---|
| JP | 2004314392 A | 11/2004 |

* cited by examiner

*Primary Examiner* — Anh T Vo
(74) *Attorney, Agent, or Firm* — K&L Gates LLP

(57) ABSTRACT

A processor of a liquid supply system performs correction processing of performing a supply operation or a return operation and delivering a liquid of a correction amount from a tank of increase to a tank of decrease. The correction amount corresponding to less than two times a circulation change amount and is an amount of change in a remaining amount of the liquid in a server tank or a printer tank from before to after circulation processing of performing the supply operation and the return operation. The tank of increase is a tank, of the server tank and the printer tank, in which the remaining amount of the liquid increases from before to after the circulation processing. The tank of decrease is a tank, of the server tank and the printer tank, in which the remaining amount of the liquid decreases from before to after the circulation processing.

10 Claims, 9 Drawing Sheets

LIQUID SUPPLY SYSTEM, CONTROL METHOD, NON-TRANSITORY COMPUTER-READABLE MEDIUM STORING COMPUTER-READABLE INSTRUCTIONS, AND LIQUID SUPPLY DEVICE

REFERENCE TO RELATED APPLICATIONS

This application claims priority from Japanese Patent Application No. 2022-191814 filed on Nov. 30, 2022. The entire content of the priority application is incorporated herein by reference.

BACKGROUND ART

A liquid supply system that supplies a liquid to a printer is known. The liquid supply system is provided with a main tank and the printer. Ink is stored in the main tank as one type of the liquid. The printer is provided with a sub tank. The sub tank is connected to the main tank via a main tank tube. The liquid supply system supplies the ink from the main tank to the sub tank via the main tank tube.

DESCRIPTION

In the above-described liquid supply system, in order to suppress the possibility of unevenness in a state of the ink, such as a temperature distribution, a density distribution and the like, it is conceivable to circulate the ink between the main tank and the sub tank via the main tank tube. In this case, there is a possibility that an actual remaining amount of the ink in the main tank after the circulation changes from the remaining amount of the ink in the main tank before the circulation, and an actual remaining amount of the ink in the sub tank after the circulation changes from the remaining amount of the ink in the sub tank before the circulation.

Embodiments of the broad principles derived herein provide a liquid supply system, a control method, a non-transitory computer-readable medium storing computer-readable instructions, and a liquid supply device that contribute to causing an actual remaining amount of a liquid in a tank after circulation to be closer to a remaining amount of the liquid in the tank before the circulation.

A first aspect of the present disclosure relates to a liquid supply system supplying a liquid to a printer tank. The printer tank is a tank provided in a printer. The liquid supply system includes a tube, a liquid delivery mechanism, a processor, and a memory. The tube connects the printer tank and a server tank configured to store the liquid. The liquid delivery mechanism is provided in the tube, and is configured to perform a supply operation of supplying the liquid from the server tank to the printer tank via the tube, and a return operation of returning the liquid from the printer tank to the server tank via the tube. The memory stores computer-readable instructions that, when executed by the processor, cause the processor to perform processes. The processes include circulation processing of causing the liquid delivery mechanism to perform the supply operation and the return operation. The processes include correction processing of causing the liquid delivery mechanism to perform one of the supply operation or the return operation. The correction processing delivers the liquid of a correction amount from a tank of increase to a tank of decrease. The correction amount is less than two times a circulation change amount. The circulation change amount is an amount of change in a remaining amount of the liquid in the server tank or the printer tank from before to after the circulation processing. The tank of increase is a tank, of the server tank and the printer tank, in which the remaining amount of the liquid increases from before to after the circulation processing. The tank of decrease is a tank, of the server tank and the printer tank, in which the remaining amount of the liquid decreases from before to after the circulation processing.

According to the first aspect, the correction amount is less than two times the circulation change amount, and thus, the change amount of the remaining amount of the liquid in the server tank or the printer tank after the processing including the circulation processing and the correction processing from the remaining amount of the liquid in the server tank or the printer tank before the processing including the circulation processing and the correction processing is less than the circulation change amount. As a result, the processor contributes to causing the actual remaining amount of the liquid in the tank after the circulation to be closer to the remaining amount of the liquid in the tank before the circulation.

A second aspect of the present disclosure relates to a control method by a liquid supply system supplying a liquid to a printer tank. The printer tank is a tank provided in a printer. The liquid supply system includes a tube and a liquid delivery mechanism. The tube connects the printer tank and a server tank configured to store the liquid. The liquid delivery mechanism is provided in the tube. The liquid delivery mechanism is configured to perform a supply operation of supplying the liquid from the server tank to the printer tank via the tube, and a return operation of returning the liquid from the printer tank to the server tank via the tube. The control method includes circulation processing of causing the liquid delivery mechanism to perform the supply operation and the return operation. The control method includes correction processing of causing the liquid delivery mechanism to perform one of the supply operation or the return operation. The correction processing delivers the liquid of a correction amount from a tank of increase to a tank of decrease. The correction amount is less than two times a circulation change amount. The circulation change amount is an amount of change in a remaining amount of the liquid in the server tank or the printer tank from before to after the circulation processing. The tank of increase is a tank, of the server tank and the printer tank, in which the remaining amount of the liquid increases from before to after the circulation processing. The tank of decrease is a tank, of the server tank and the printer tank, in which the remaining amount of the liquid decreases from before to after the circulation processing.

The second aspect contributes to the same advantage as the first aspect.

A third aspect of the present disclosure relates to a non-transitory computer-readable medium storing computer-readable instructions executed by a computer of a liquid supply system supplying a liquid to a printer tank. The printer tank is a tank provided in a printer. The liquid supply system includes a tube and a liquid delivery mechanism. The tube connects the printer tank and a server tank configured to store the liquid. The liquid delivery mechanism is provided in the tube. The liquid delivery mechanism is configured to perform a supply operation of supplying the liquid from the server tank to the printer tank via the tube, and a return operation of returning the liquid from the printer tank to the server tank via the tube. The instructions, when executed by the computer, causes the computer to perform processes. The processes include circulation processing of causing the liquid delivery mechanism to perform the supply operation and the return operation. The processes include correction processing of causing the liquid delivery mechanism to perform one of the supply operation or the return operation. The correction processing delivers the liquid of a correction amount from a tank of increase to a tank of decrease. The correction amount is less than two times a circulation change amount. The circulation change amount is an amount of change in a remaining amount of the liquid in the server tank or the printer tank from before to after the circulation processing. The tank of increase is a tank, of the server tank and the printer tank, in which the remaining amount of the liquid increases from before to after the circulation processing. The tank of decrease is a tank, of the server tank and the printer tank, in which the remaining amount of the liquid decreases from before to after the circulation processing.

The third aspect contributes to the same advantage as the first aspect.

A fourth aspect of the present disclosure relates to a liquid supply device supplying a liquid to a printer tank. The printer tank is a tank provided in a printer. The liquid supply device includes a tube, a liquid delivery mechanism, a processor, and a memory. The tube connects the printer tank and a server tank configured to store the liquid. The liquid delivery mechanism is provided in the tube, and is configured to perform a supply operation of supplying the liquid from the server tank to the printer tank via the tube, and a return operation of returning the liquid from the printer tank to the server tank via the tube. The memory stores computer-readable instructions that, when executed by the processor, cause the processor to perform processes. The processes include circulation processing of causing the liquid delivery mechanism to perform the supply operation and the return operation. The processes include correction processing of causing the liquid delivery mechanism to perform one of the supply operation or the return operation. The correction processing delivers the liquid of a correction amount from a tank of increase to a tank of decrease. The correction amount is less than two times a circulation change amount. The circulation change amount is an amount of change in a remaining amount of the liquid in the server tank or the printer tank from before to after the circulation processing. The tank of increase is a tank, of the server tank and the printer tank, in which the remaining amount of the liquid increases from before to after the circulation processing. The tank of decrease is a tank, of the server tank and the printer tank, in which the remaining amount of the liquid decreases from before to after the circulation processing.

The fourth aspect contributes to the same advantage as the first aspect.

OVERALL CONFIGURATION OF LIQUID SUPPLY SYSTEM 100

Figure 1:
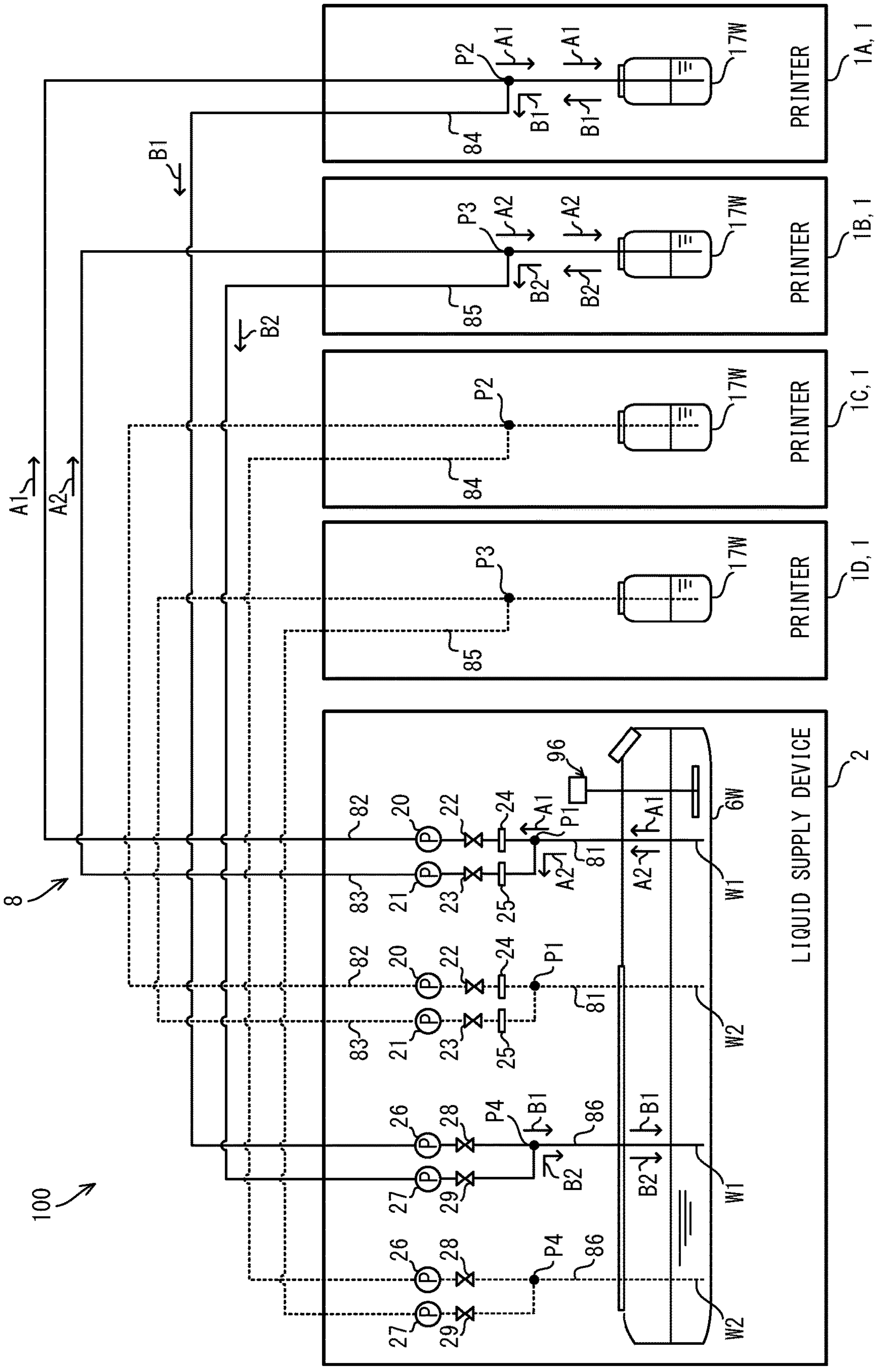
FIG. 1 is a flow path configuration diagram of a liquid supply system.

A liquid supply system 100 according to an embodiment of the present disclosure will be described with reference to the appended drawings. As shown in FIG. 1, the liquid supply system 100 includes a plurality of printers 1, and a liquid supply device 2. The liquid supply system 100 supplies an ink, for example, as a liquid, to each of the plurality of printers 1, from the liquid supply device 2.

A number of the plurality of printers 1 is not limited to a particular number, and, for example, four printers 1A, 1B, 1C, and 1D are connected to the single liquid supply device 2. The printer 1 is an inkjet printer, for example, and performs printing by ejecting the ink onto a print medium (not shown in the drawings). The print medium is a cloth, paper, or the like, and is a T-shirt, for example.

The ink is, for example, white (W), black (K), yellow (Y), cyan (C), or magenta (M). Hereinafter, of the five colors of the ink, the white color ink will be referred to as "white ink," and when the four colors of the black, cyan, yellow and magenta inks are collectively referred to, or when one of the inks is not particularly specified, they will be referred to as "color inks."

The white ink is used in printing as a portion representing white in an image, or as a base for the color inks. The color inks are ejected directly onto the print medium, or onto the base created using the white ink, and are used in printing of a color image.

<Mechanical Configuration of Printer 1>

Figure 2:
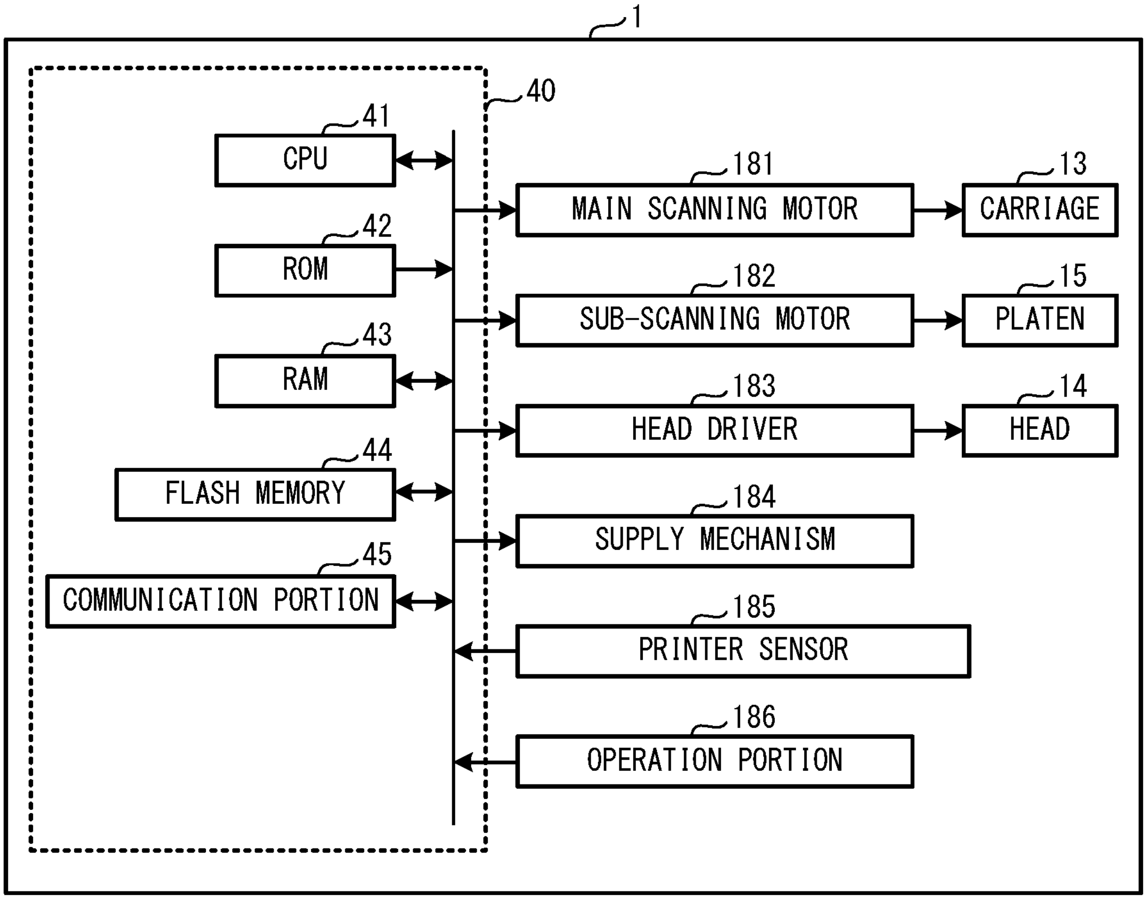
FIG. 2 is a block diagram showing an electrical configuration of a printer.

The printer 1 is provided with a platen 15, a carriage 13, and a head 14 shown in FIG. 2. The platen 15 is provided to be moveable in a sub-scanning direction. The print medium is placed on the platen 15. The carriage 13 is provided to be movable in a main scanning direction. The main scanning direction is orthogonal to the sub-scanning direction.

The head 14 is mounted to the carriage 13, and moves together with the carriage 13 in the main scanning direction. The head 14 includes nozzles and ejects white ink from the nozzles onto the print medium on the platen 15. In addition to the head 14, the printer 1 is provided with a head or a plurality of heads (hereinafter referred to as the "other heads"). In the present embodiment, the other heads are not shown in the drawings, and a description thereof is simplified. The other heads are different from the head 14 in that the other heads eject the color inks, rather than the white ink, from the nozzles onto the print medium on the platen 15.

The printer 1 is provided with a printer tank 17W. The printer tank 17W receives the supply of the white ink from the liquid supply device 2, and stores the supplied white ink. The printer tank 17W is connected to the head 14 shown in FIG. 2, via a tube (not shown in the drawings).

In addition to the printer tank 17W, the printer 1 is provided with a plurality of printer tanks (hereinafter referred to as "other printer tanks"). In the present embodiment, the other printer tanks are not shown in the drawings, and a description thereof is simplified. The other printer tanks differ from the printer tank 17W in that the other printer tanks receive the supply of the color inks from the liquid supply device 2, in place of the white ink. The other printer tanks are connected to the other heads via tubes (not shown in the drawings).

The white ink is supplied from the printer tank 17W to the head 14 shown in FIG. 2 via the tube (not shown in the drawings), by the driving of a supply mechanism 184 shown in FIG. 2. Similarly, the color inks are supplied to the other heads from the other printer tanks. The carriage 13 moves in the main scanning direction as a result of the driving of a main scanning motor 181 shown in FIG. 2. The platen 15 moves in the sub-scanning direction as the result of the driving of a sub-scanning motor 182 shown in FIG. 2. In this way, the head 14 moves in the main scanning direction and the sub-scanning direction relative to the print medium on the platen 15.

While the head 14 moves in the main scanning direction and the sub-scanning direction relative to the print medium on the platen 15, the head 14 ejects the white ink from the nozzles onto the print medium on the platen 15 as a result of the driving of a head driver 183 shown in FIG. 2. Similarly, the other heads eject the color inks from the nozzles onto the print medium on the platen 15. As a result of the above, the printer 1 performs print processing of printing on the print medium.

<Mechanical Configuration of Liquid Supply Device 2>

The liquid supply device 2 is provided with a server tank 6W, tubes 8, and an agitation mechanism 96. The server tank 6W is positioned outside the plurality of printers 1, and stores the white ink. A capacity of the white ink that can be stored by the server tank 6W is greater than a capacity of the white ink that can be stored by the single printer tank 17W, and is greater than a total of the capacities of the white ink that can be stored by the printer tanks 17W of the printers 1A, 1B, 1C, and 1D. The tubes 8 configure flow paths of the white ink between the server tank 6W and the respective printer tanks 17W of the plurality of printers 1.

Figure 3:
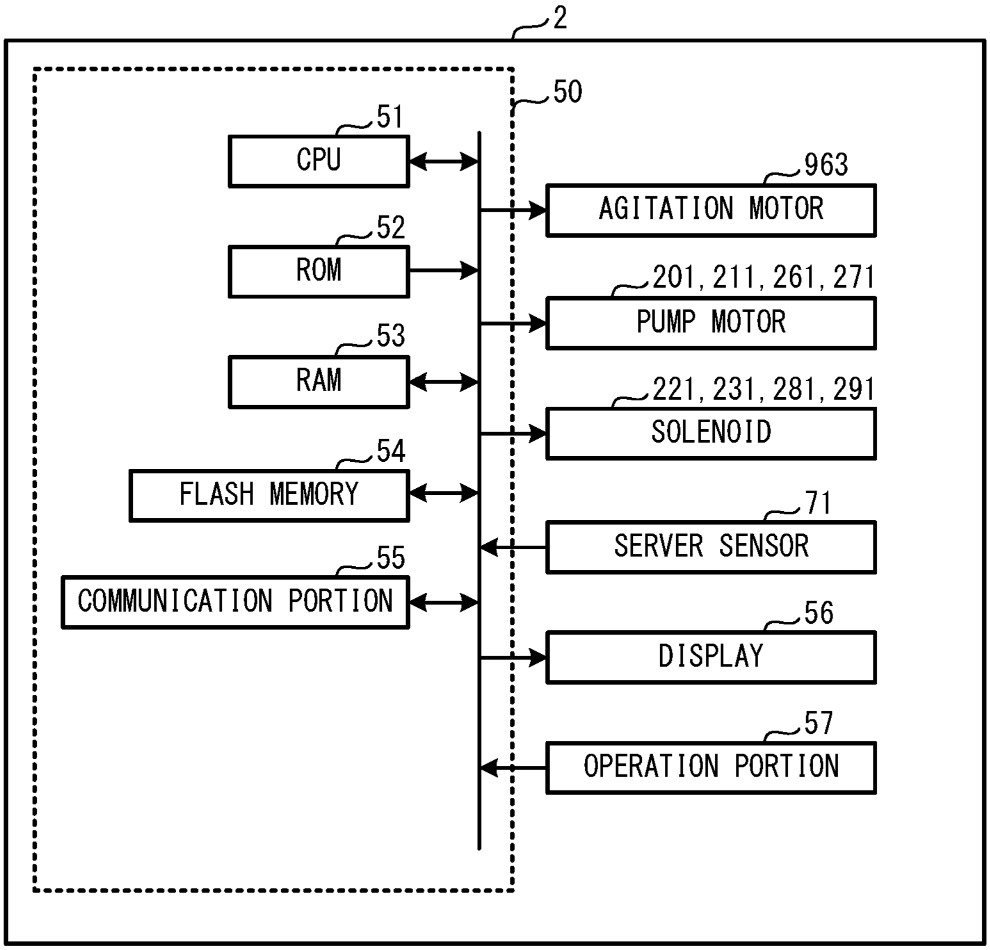
FIG. 3 is a block diagram showing an electrical configuration of the liquid supply device.

The agitation mechanism 96 is a propeller stirrer, for example, and performs an agitation operation of agitating the white ink inside the server tank 6W, as a result of the driving of an agitation motor 963 shown in FIG. 3. In the present embodiment, the white ink includes, as solid components such as pigment particles and the like, components that are more prone to settling than components included in the color inks. The component prone to settling is titanium oxide, for example. The titanium oxide is a type of inorganic pigment having a relatively high specific gravity. Since the white ink includes the component that is relatively prone to settling, the pigment particles and the like in the white ink easily precipitate as the solid components. Hereinafter, the precipitation of the solid components in the white ink will also be referred to as "settling of the white ink." By performing the agitation operation, the agitation mechanism 96 suppresses the settling of the white ink inside the server tank 6W.

Note that, in addition to the server tank 6W, the liquid supply device 2 is provided with a plurality of server tanks (hereinafter referred to as "other server tanks") and, in addition to the tubes 8, is provided with a plurality of tubes (hereinafter referred to as "other tubes"). In the present embodiment, the other server tanks and the other tubes are not shown in the drawings, and a description thereof is simplified.

The other server tanks differ from the server tank 6W in that the other server tanks store the color inks rather than the white ink. The other tubes configure flow paths of the color inks between the other server tanks and respective other printer tanks of the plurality of printers 1. The other tubes differ from the tube 8 in that the other tubes are not provided with tubes 84, 85, and 86 to be described later. Note that in the present embodiment, the agitation mechanism 96 is not provided in the other server tanks.

<Flow Path Configuration of White Ink>

A flow path of the white ink includes a first white flow path W1 and a second white flow path W2. Note that FIG. 1 shows the first white flow path W1 using solid lines and shows the second white flow path W2 using dotted lines. The first white flow path W1 connects the server tank 6W and the respective printer tanks 17W of the printers 1A and 1B to each other. The second white flow path W2 connects the server tank 6W and the respective printer tanks 17W of the printers 1C and 1D to each other.

The first white flow path W1 and the second white flow path W2 differ from each other in whether the connection destination from the liquid supply device 2 is one of the printers 1A and 1B, or the printers 1C and 1D. Thus, hereinafter, the first white flow path W1 will be described and, for the second white flow path W2, the same reference signs will be assigned as for the first white flow path W1 and the description thereof will be omitted or simplified.

The first white flow path W1 is configured by tubes 81, tubes 82 and 83, and tubes 84, 85, and 86 as the tubes 8. The tube 81 is connected to the server tank 6W. The tube 81 extends from inside the server tank 6W to a point P1. The tube 81 is connected to the tube 82 and the tube 83 at the point P1.

The tube 82 extends from the point P1 toward the printer tank 17W of the printer 1A via a point P2, and is connected to the printer tank 17W of the printer 1A. The tube 83 extends from the point P1 toward the printer 1B via a point P3, and is connected to the printer tank 17W of the printer 1B.

The tube 84 is connected to the tube 82 at the point P2. The tube 84 extends from the point P2 to a point P4, and is connected to the tube 86 at the point P4. The tube 85 is connected to the tube 83 at the point P3. The tube 85 extends from the point P3 to the point P4, and is connected to the tube 86 at the point P4. The tube 86 extends from the point P4 toward the server tank 6W, and is connected to the server tank 6W.

Hereinafter, the flow path from the server tank 6W to the printer tank 17W of the printer 1A via the tube 81 and the tube 82, and the flow path from the server tank 6W to the printer tank 17W of the printer 1B via the tube 81 and the tube 83 will be respectively referred to as a "supply flow path." The side of the server tank 6W in the supply flow path will be referred to as "upstream in the supply flow path," and the side of the printer tank 17W of the printer 1A or the printer 1B will be referred to as "downstream in the supply flow path." For example, at a halfway point in the supply flow path, the side of the server tank 6W is upstream in the supply flow path and the side of the printer tank 17W of the printer 1A or the printer 1B is downstream in the supply flow path.

The flow path from the printer tank 17W of the printer 1A to the server tank 6W via the tube 84 and the tube 86, and the flow path from the printer tank 17W of the printer 1B to the server tank 6W via the tube 85 and the tube 86 will be respectively referred to as a "circulation flow path." The side of the printer tank 17W of the printer 1A or the printer 1B in the circulation flow path will be referred to as "upstream in the circulation flow path," and the side of the server tank 6W will be referred to as "downstream in the circulation flow path." For example, at a halfway point in the circulation flow path, the side of the printer tank 17W of the printer 1A or the printer 1B is upstream in the circulation flow path and the side of the server tank 6W is downstream in the circulation flow path.

A supply pump 20, a supply valve 22, and a filter 24 are provided in the tube 82. A supply pump 21, a supply valve 23, and a filter 25 are provided in the tube 83. The supply pump 20 is positioned further upstream in the supply flow path than the point P2. The supply pump 21 is positioned further upstream in the supply flow path than the point P3.

As a result of being respectively driven by pump motors 201 and 211 shown in FIG. 3, the supply pumps 20 and 21 suck up the white ink from the server tank 6W via the tube 81. As a result of being driven by the pump motor 201 shown in FIG. 3, the supply pump 20 sends the sucked up white ink toward the printer tank 17W of the printer 1A, via the tube 82. As a result of being driven by the pump motor 211 shown in FIG. 3, the supply pump 21 sends the sucked up white ink toward the printer tank 17W of the printer 1B, via the tube 83.

Hereinafter, a state in which a valve is closed will be referred to as a "closed state," and a state in which valve is open will be referred to as an "open state." In the closed state, the valve causes the flow path to be in a blocked state. In the open state, the valve causes the flow path to be in a communicated state.

The supply valve 22 is positioned further upstream in the supply flow path than the supply pump 20. The supply valve 23 is positioned further upstream in the supply flow path than the supply pump 21. The supply valves 22 and 23 switch between the closed state and the open state as a result of being driven by solenoids 221 and 231 shown in FIG. 3, respectively. In the closed state, the supply valve 22 causes the tube 82 to be in the blocked state, and in the open state, causes the tube 82 to be in the communicated state. In the closed state, the supply valve 23 causes the tube 83 to be in the blocked state, and in the open state, causes the tube 83 to be in the communicated state.

The filter 24 is positioned further upstream in the supply flow path than the supply valve 22. The filter 25 is positioned further upstream in the supply flow path than the supply valve 23. The filters 24 and 25 are respectively configured by a non-woven fabric, a woven fabric, a resin film, or a porous metal piece, for example, and filter the white ink.

A circulation pump 26 and a circulation valve 28 are provided in the tube 84. A circulation pump 27 and a circulation valve 29 are provided in the tube 85. As a result of being driven by a pump motor 261 shown in FIG. 3, the circulation pump 26 sucks up the white ink from the printer tank 17W of the printer 1A, via a portion of the tube 82 further downstream in the supply flow path than the point P2. As a result of being driven by a pump motor 271 shown in FIG. 3, the circulation pump 27 sucks up the white ink from the printer tank 17W of the printer 1B, via a portion of the tube 83 further downstream in the supply flow path than the point P3. As a result of being respectively driven by the pump motors 261 and 271 shown in FIG. 3, the circulation pumps 26 and 27 send the sucked up white ink toward server tank 6W, via the tube 86.

The circulation valve 28 is positioned further downstream in the supply flow path than the circulation pump 26. The circulation valve 29 is positioned further downstream in the circulation flow path than the circulation pump 27. The circulation valves 28 and 29 switch between the closed state and the open state as a result of being driven by solenoids 281 and 291 shown in FIG. 3, respectively. In the closed state, the circulation valve 28 causes the tube 84 to be in the blocked state, and in the open state, causes the tube 84 to be in the communicated state. In the closed state, the circulation valve 29 causes the tube 85 to be in the blocked state, and in the open state, causes the tube 85 to be in the communicated state.

In the above-described configuration, by causing one or both of the supply valves 22 and 23 to be in the open state and driving, of the supply pump 20 and the supply pump 21, the supply pump corresponding to the valve[s] in the open state, the liquid supply system 100 supplies the white ink from the server tank 6W to the printer tank 17W via the tube 8.

Hereinafter, an operation in which the liquid supply system 100 supplies the liquid from the server tank 6W toward the printer tank 17W via the tube 8 will be referred to as a "supply operation." In the supply operation of the present embodiment, the liquid supply system 100 can supply the white ink from the server tank 6W to each of the plurality of printer tanks 17W of the plurality of printers 1, via the tube 8, in parallel or to one of the plurality of printers 1 at a time. In other words, in each of the supply flow paths to the plurality of printers 1, the server tank 6W is positioned further upstream than each of the plurality of printers 1.

As an example of a flow of the white ink when the supply operation has been performed, a flow of the white ink from the server tank 6W via the tube 8 toward the printer tanks 17W of each of the printers 1A and 1B in the first white flow path W1 will be described. When the white ink is supplied from the server tank 6W to the printer tank 17W of the printer 1A, the white ink flows from the server tank 6W toward the printer tank 17W of the printer 1A via the tube 81 and the tube 82 (refer to arrows A1). When the white ink is supplied from the server tank 6W to the printer tank 17W of the printer 1B, the white ink flows from the server tank 6W toward the printer tank 17W of the printer 1B via the tube 81 and the tube 83 (refer to arrows A2).

In a state in which one or both of the circulation valve 28 and the circulation valve 29 are in the open state, of the circulation pump 26 and the circulation pump 27, the liquid supply system 100 drives the circulation pump corresponding to the valve[s] in the open state, and thus returns the white ink from the printer tank 17W toward the server tank 6W, via the tube 8.

Hereinafter, an operation in which the liquid supply system 100 returns the white ink from the printer tanks 17W toward the server tank 6W via the tube 8 will be referred to as a "return operation." In the return operation of the present embodiment, the liquid supply system 100 can return the white ink from the plurality of printer tanks 17W of each of the plurality of printers 1 to the server tank 6W, via the tube 8, in parallel or from one of the plurality of printers 1 at a time.

As an example of a flow of the white ink when the return operation has been performed, a flow of the white ink from the printer tank 17W of each of the printers 1A and 1B via the tube 8 toward the server tank 6W in the first white flow path W1 will be described. When the white ink is returned to the server tank 6W from the printer tank 17W of the printer 1A, the white ink flows from the printer tank 17W of the printer 1A toward the server tank 6W via the tube 82, the point P2, the tube 84, and the tube 86 (refer to arrows B1). When the white ink is returned to the server tank 6W from the printer tank 17W of the printer 1B, the white ink flows from the printer tank 17W of the printer 1B toward the server tank 6W via the tube 83, the point P3, the tube 85, and the tube 86 (refer to arrows B2).

Both when the white ink is supplied from the server tank 6W to the printer tank 17W of the printer 1A, and when the white ink is returned to the server tank 6W from the printer tank 17W of the printer 1A, the white ink flows through a portion of the tube 82 further downstream in the supply flow path than the point P2. Both when the white ink is supplied from the server tank 6W to the printer tank 17W of the printer 1B, and when the white ink is returned to the server tank 6W from the printer tank 17W of the printer 1B, the white ink flows through a portion of the tube 83 further downstream in the supply flow path than the point P3.

By performing one of the supply operation or the return operation after the other operation has been performed, the liquid supply system 100 can circulate the white ink between the server tank 6W and the respective printer tanks 17W of the plurality of printers 1, via the tubes 8. By alternating the supply operations and return operations, the liquid supply system 100 may circulate the white ink between the server tank 6W and the respective printer tanks 17W of the plurality of printers 1, via the tubes 8.

Hereinafter, an operation in which the liquid supply system 100 circulates the white ink between the server tank 6W and the printer tank 17W via the tube 8 will be referred to as a "circulation operation." The liquid supply system 100 performs the circulation operation in the first white flow path W1, for example. In this way, the liquid supply system 100 suppresses the white ink from settling inside the server tank 6W and in the first white flow path W1, and in the respective printer tanks of the printers 1A and 1B.

<Electrical Configuration of Printer 1>

As shown in FIG. 2, the printer 1 is provided with a control device 40. The control device 40 is provided with a CPU 41, a ROM 42, a RAM 43, a flash memory 44, and a communication portion 45. The CPU 41 controls the printer 1, and functions as a processor. The CPU 41 controls the print processing, for example. The CPU 41 is electrically connected to the ROM 42, the RAM 43, the flash memory 44, and the communication portion 45.

The ROM 42 stores a control program for the CPU 41 to control operations of the printer 1, information necessary for the CPU 41 when executing various programs, and the like. The RAM 43 temporarily stores various data and the like used by the control program. The flash memory 44 is non-volatile, and stores calibration data of printer sensors 185 to be described later, and the like. The communication portion 45 is a controller for communicating, in a wired or wireless manner with an external device. The CPU 41 communicates with the liquid supply device 2, for example, using the communication portion 45.

The main scanning motor 181, the sub-scanning motor 182, the head driver 183, the supply mechanism 184, the plurality of printer sensors 185, and an operation portion 186 are electrically connected to the CPU 41. The main scanning motor 181, the sub-scanning motor 182, the head driver 183, and the supply mechanism 184 are driven by control of the CPU 41.

The printer sensor 185 is provided in the printer tank 17W shown in FIG. 1. The printer sensor 185 is a pressure sensor, for example. The printer sensor 185 detects a printer remaining amount by detecting a pressure inside the printer tank 17W. The printer remaining amount is a remaining amount of the white ink inside the printer tank 17W. A signal indicating the printer remaining amount detected by the printer sensor 185 is output to the CPU 41.

The operation portion 186 is a touch panel display or the like, displays various information, and outputs information to the CPU 41 in accordance with an operation by the user. By operating the operation portion 186, the user can input, to the printer 1, a print command for starting printing by the printer 1 and the like.

<Electrical Configuration of Liquid Supply Device 2>

As shown in FIG. 3, the liquid supply device 2 is provided with a control device 50. The control device 50 is provided with a CPU 51, a ROM 52, a RAM 53, a flash memory 54, and a communication portion 55. The CPU 51 controls the liquid supply device 2, and functions as a processor. The CPU 51 is electrically connected to the ROM 52, the RAM 53, the flash memory 54, and the communication portion 55.

The ROM 52 stores a control program for the CPU 51 to control operations of the liquid supply device 2, information necessary for the CPU 51 when executing various programs, and the like. The RAM 53 temporarily stores various data and the like used by the control program. The flash memory 54 is non-volatile, and stores calibration data of the server sensors 71, and the like. The communication portion 55 is a controller for communicating, in a wired or wireless manner with an external device. The CPU 51 communicates with each of the printers 1A, 1B, 1C, and 1D, for example, via the communication portion 55.

The agitation motor 963, the pump motors 201, 211, 261, and 271, the solenoids 221, 231, 281, and 291, the server sensor 71, the display 56, and the operation portion 57 are electrically connected to the CPU 51.

The agitation motor 963, the pump motors 201, 211, 261, and 271, the solenoids 221, 231, 281, and 291, and the display 56 are driven by control of the CPU 51. The server sensor 71 is a weight sensor, for example, and detects a server remaining amount by the weight. The server remaining amount is a remaining amount of the white ink inside the server tank 6W. A signal indicating the server remaining amount detected by the server sensor 71 is output to the CPU 51.

<Remaining Amount Error>

When the actual server remaining amount after the circulation operation changes from the server remaining amount before the circulation operation, it becomes difficult for the liquid supply system 100 to manage a replacement timing of the server tank 6W, or a replenishment timing of the white ink to the server tank 6W based on the server remaining amount, for example. When the actual printer remaining amount after the circulation operation changes from the printer remaining amount before the circulation operation, it becomes difficult for the liquid supply system 100 to manage a timing to perform the supply operation based on the printer remaining amount, for example.

Furthermore, when the actual server remaining amount after the circulation operation changes from the server remaining amount before the circulation operation, and the actual printer remaining amount after the circulation operation changes from the printer remaining amount before the circulation operation, there is a possibility that the white ink may be overflowing from the server tank 6W or the printer tank 17W due to the circulation operation. Thus, it is preferable that the circulation operation be controlled such that the actual server remaining amount after the circulation operation is the same as the server remaining amount before the circulation operation, and that the actual printer remaining amount after the circulation operation is the same as the printer remaining amount before the circulation operation.

In the present embodiment, due to the circulation operation, oscillation may occur in the liquid level or the weight of the white ink inside the server tank 6W, or a minute amount of the white ink may flow from one to the other of the server tank 6W and the tube 8 after the circulation operation. In this case, there is a possibility that an error may occur between the server remaining amount detected by the server sensor 71 and the actual server remaining amount. Hereinafter, the oscillation in the liquid level of the white ink, or in the weight thereof will be simply referred to as the "oscillation of the white ink."

Similarly, due to the circulation operation, the oscillation of the white ink may occur inside the printer tank 17W, or a minute amount of the white ink may flow from one to the other of the printer tank 17W and the tube 8 after the circulation operation. In this case, there is a possibility that an error may occur between the printer remaining amount detected by the printer sensor 185 and the actual printer remaining amount.

When the above-described error occurs, there is a possibility that the actual server remaining amount after the circulation operation may change from the server remaining amount before the circulation operation, and that the actual printer remaining amount after the circulation operation may change from the printer remaining amount before the circulation operation. In the present embodiment, by performing main processing to be described below, the liquid supply system 100 contributes to suppressing the possibility of the actual server remaining amount after the circulation operation changing from the server remaining amount before the circulation operation, and the possibility of the actual printer remaining amount after the circulation operation changing from the printer remaining amount before the circulation operation.

<Main Processing>

Figure 4:
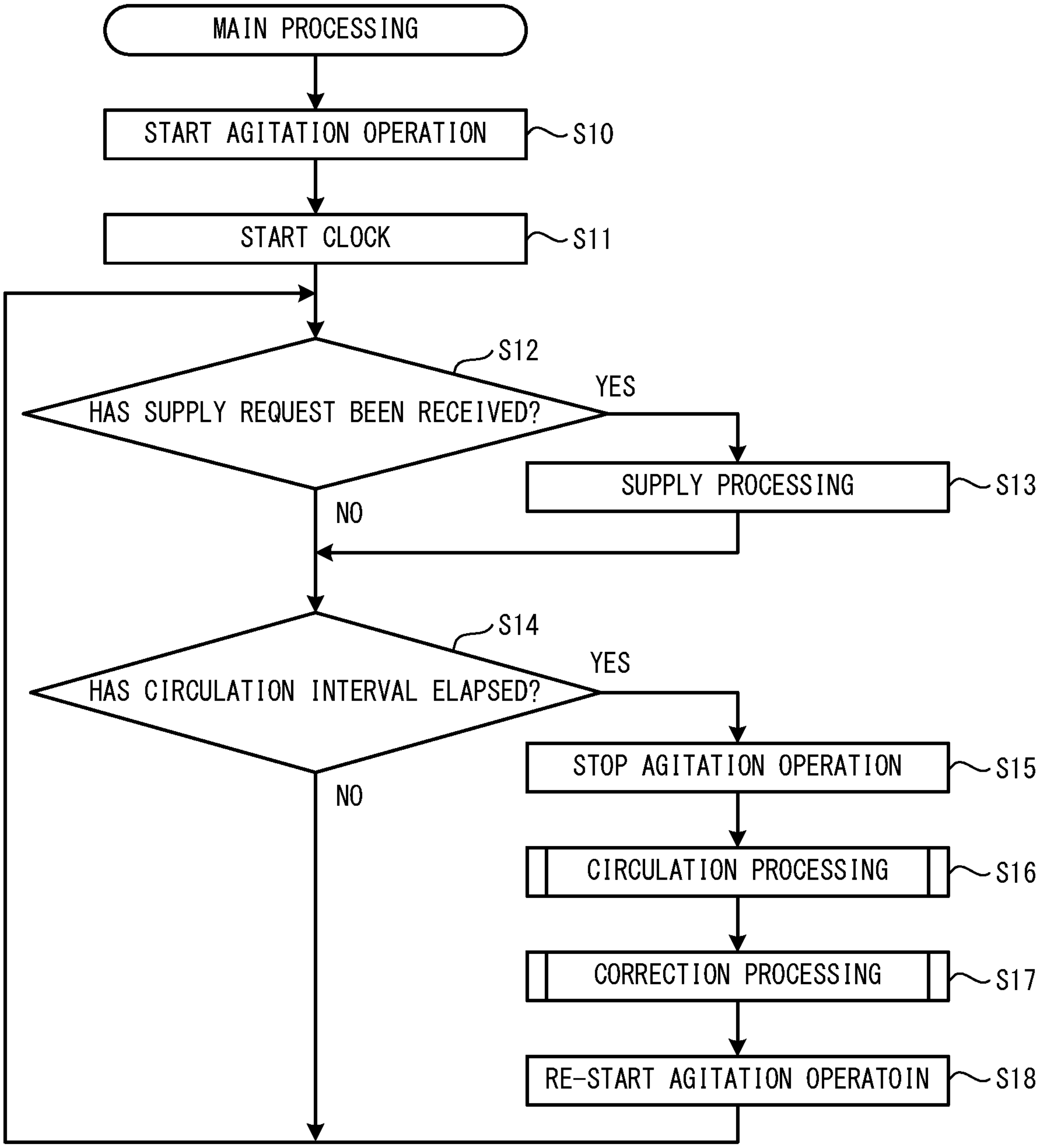
FIG. 4 is a flowchart of main processing.

When a power supply to the liquid supply device 2 is turned on, for example, the CPU 51 performs the main processing shown in FIG. 4, by reading out and executing the control program from the ROM 52. In the main processing, the CPU 51 performs control relating to the supply operation and the return operation. In the main processing, the control relating to the supply operation and the return operation is performed for the second white flow path W2 in a similar manner as for the first white flow path W1. In the present embodiment, with respect to the main processing, the control relating to the first white flow path W1 will be described and a description of the control relating to the second white flow path W2 will be omitted. Hereinafter, the description will be made assuming that, at the start of the main processing, all of the supply valves 22 and 23 and the circulation valves 28 and 29 shown in FIG. 1 are in the closed state.

As shown in FIG. 4, when the main processing is started, the CPU 51 controls the agitation motor 963 shown in FIG. 3, and starts the agitation operation by the agitation mechanism 96 shown in FIG. 1 (S10). The CPU 51 starts a clock using a timer counter (S11). The timer counter is stored in the RAM 53, and is used for measuring a circulation interval and a supply time period to be described later.

The CPU 51 determines whether or not a supply request for performing supply processing (S13) to be described later has been received from the printer 1A or the printer 1B (S12). For example, when the printer 1A performs the print processing, the white ink in the printer tank 17W of the printer 1A is consumed and the printer remaining amount of the printer 1A decreases. For example, in the printer 1A, when the printer remaining amount has become equal to or less than a predetermined supply start remaining amount, the CPU 41 transmits the supply request to the liquid supply device 2. The supply start remaining amount is stored in advance in the flash memory 44, for example.

When the supply request has not been acquired from either the printer 1A or the printer 1B (no at S12), the CPU 51 shifts the processing to S14. When the supply request has been received from the printer 1A or the printer 1B (yes at S12), the CPU 51 performs the supply processing (S13). In the supply processing, the CPU 51 controls the supply operation for the printer 1 from which the supply request has been acquired. For example, when the supply request has been acquired from the printer 1A, the CPU 51 controls the solenoid 221 shown in FIG. 3 in the supply operation, and causes the supply valve 22 to be in the open state. In this state, the CPU 51 controls the pump motor 201 shown in FIG. 3, and starts the driving of the supply pump 20. In this way, the white ink is supplied from the server tank 6W to the printer tank 17W of the printer 1A, via the tube 8.

When, for example, the printer remaining amount has reached a predetermined supply stop remaining amount as a result of the supply operation, the CPU 41 transmits a supply stop request to the liquid supply device 2. The supply stop remaining amount is stored in advance in the flash memory 44, for example. The supply stop remaining amount is greater than the supply start remaining amount, for example. When the supply stop request has been acquired from the printer 1A, for example, the CPU 51 stops the driving of the pump motor 201 shown in FIG. 3, and stops the driving of the supply pump 20. The CPU 51 controls the solenoid 221 shown in FIG. 3 and causes the supply valve 22 to be in the closed state. In this way, the CPU 51 stops the supply operation and ends the supply processing. The CPU 51 shifts the processing to S14.

The CPU 51 refers to the timer counter in the RAM 53, and determines whether or not the circulation interval has elapsed (S14). In the present embodiment, circulation processing (S16) to be described later is periodically performed. First circulation processing and second circulation processing will be defined. The first circulation processing is one of the circulation processing that is periodically performed. The second circulation processing is the circulation processing subsequent to the first circulation processing, of the circulation processing that is periodically performed. The circulation interval is a time period between the first circulation processing and the second circulation processing, and is stored in advance in the flash memory 54, for example.

When the circulation interval has not elapsed (no at S14), the CPU 51 returns the processing to S12. When the circulation interval has elapsed (yes at S14), the CPU 51 stops the driving of the agitation motor 963 shown in FIG. 3, and stops the agitation operation by the agitation mechanism 96 (S15). In this way, the oscillation of the white ink inside the server tank 6W decreases.

The CPU 51 performs the circulation processing (S16). In the circulation processing, the CPU 51 controls the circulation operation. The circulation processing will be described in more detail later (refer to FIG. 5). The CPU 51 performs correction processing (S17). When the circulation interval has elapsed, the correction processing is performed immediately after the circulation processing. In the correction processing, the CPU 51 controls one of the supply operation or the return operation (the return operation in the present embodiment). The correction processing will be described in more detail later (refer to FIG. 6). The CPU 51 controls the agitation motor 963 shown in FIG. 3 and re-starts the agitation operation by the agitation mechanism 96 (S18). The CPU 51 returns the processing to S12.

<Circulation Processing>

Hereinafter, with reference to FIG. 7, a case will be described in which the circulation interval has elapsed in the printer 1A as an example. When the circulation interval has elapsed in the printer 1A, in the circulation processing, the CPU 51 controls the circulation operation for the printer 1A.

Figure 5:
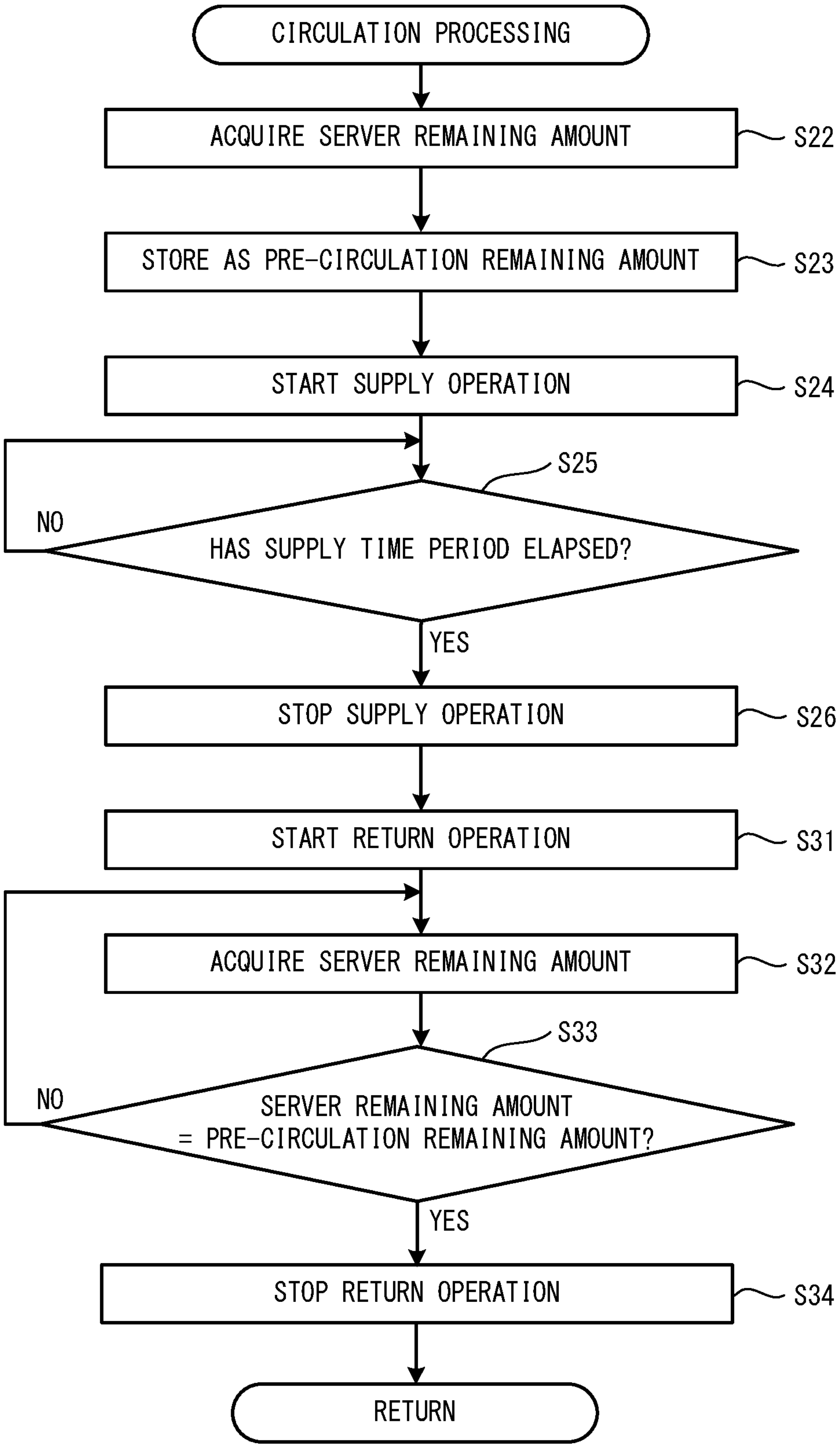
FIG. 5 is a flowchart of circulation processing.

As shown in FIG. 5, when the circulation processing is started, the CPU 51 acquires the server remaining amount from the server sensor 71 shown in FIG. 3 (S22). Since the oscillation of the white ink inside the server tank 6W has decreased as a result of the processing at S15 shown in FIG. 4, the error between the acquired server remaining amount and the actual server remaining amount becomes less, compared to a case in which the server remaining amount is acquired from the server sensor 71 during execution of the agitation operation. The CPU 51 stores the server remaining amount acquired by the processing at S22 in the RAM 53, as a pre-circulation remaining amount (S23). The pre-circulation remaining amount is the server remaining amount at the start of the circulation operation, and in the present embodiment, is the server remaining amount at the start of the supply operation in processing at S24 to be described below. As shown in FIG. 7, at a time point before the processing at S24 to be described below, the server tank 6W is in a state S1. In the state S1, a remaining amount V1 indicates the pre-circulation remaining amount.

As shown in FIG. 5, the CPU 51 starts the supply operation (S24). In the processing at S24, the CPU 51 controls the solenoid 221 shown in FIG. 3 and causes the supply valve 22 shown in FIG. 1 to be in the open state. In this state, the CPU 51 controls the pump motor 201 shown in FIG. 3 and starts the driving of the supply pump 20 shown in FIG. 1. In this way, the white ink is supplied from the server tank 6W to the printer tank 17W of the printer 1A, via the tube 8.

The CPU 51 refers to the timer counter in the RAM 53, and determines whether or not the supply time period has elapsed (S25). The supply time period is a time period from the start to the end of the supply operation, and is stored in advance in the flash memory 54, for example.

When the supply time period has not elapsed (no at S25), the CPU 51 repeats the processing at S25 until the supply time period has elapsed. When the supply time period has elapsed (yes at S25), the CPU 51 stops the supply operation (S26). In the processing at S26, the CPU 51 stops the driving of the pump motor 201 shown in FIG. 3, and stops the driving of the supply pump 20 shown in FIG. 1. The CPU 51 controls the solenoid 221 shown in FIG. 3 and causes the supply valve 22 shown in FIG. 1 to be in the closed state. In this way, the supply of the white ink from the server tank 6W to the printer tank 17W of the printer 1A via the tube 8 is stopped.

Figure 7:
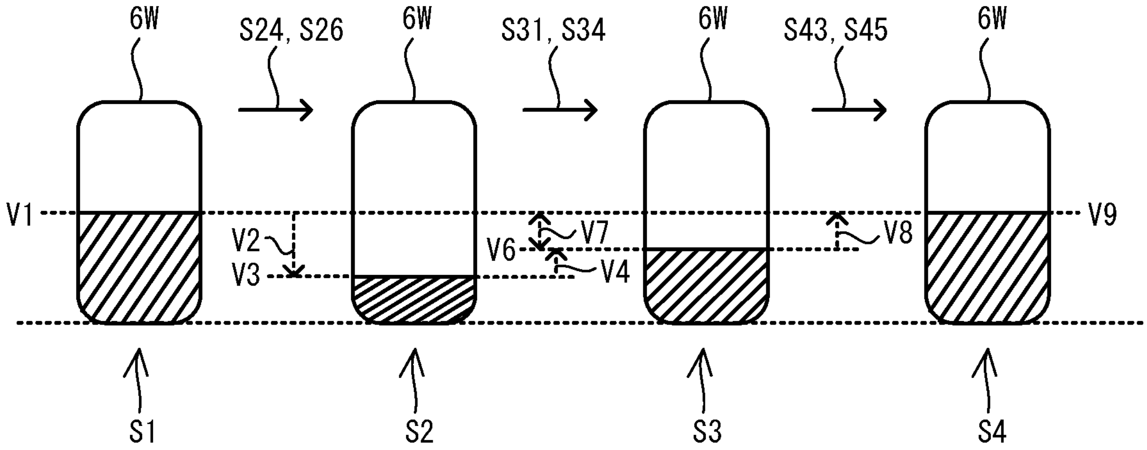
FIG. 7 is a diagram showing changes of a server remaining amount in the circulation processing and the correction processing.

As shown in FIG. 7, in the processing at S24 and S26, the server tank 6W transitions from the state S1 to a state S2. In this case, the server remaining amount decreases from the remaining amount V1 by an amount V2 corresponding to the length of the supply time period. In this way, in the state S2, the server remaining amount becomes a remaining amount V3.

As shown in FIG. 5, the CPU 51 starts the return processing (S31). In the processing at S31, the CPU 51 controls the solenoid 281 shown in FIG. 3, and causes the circulation valve 28 shown in FIG. 1 to be in the open state. In this state, the CPU 51 controls the pump motor 261 shown in FIG. 3 and starts the driving of the circulation pump 26 shown in FIG. 1. In this way, the white ink is returned from the printer tank 17W of the printer 1A to the server tank 6W via the tube 8.

The CPU 51 acquires the server remaining amount from the server sensor 71 shown in FIG. 3 (S32). The CPU 51 determines whether or not the server remaining amount acquired by the processing at S32 has reached the pre-circulation remaining amount stored by the processing at S23 (S33).

When the server remaining amount is less than the pre-circulation remaining amount (no at S33), the CPU 51 returns the processing to S32. When the server remaining amount has reached the pre-circulation remaining amount (yes at S33), the CPU 51 stops the return operation (S34). In the processing at S34, the CPU 51 stops the driving of the pump motor 261 shown in FIG. 3, and stops the driving of the circulation pump 26 shown in FIG. 1. The CPU 51 controls the solenoid 281 shown in FIG. 3 and causes the circulation valve 28 shown in FIG. 1 to be in the closed state. In this way, the returning of the white ink from the printer tank 17W of the printer 1A to the server tank 6W via the tube 8 is stopped. The CPU 51 returns the processing to the main processing shown in FIG. 4.

As shown in FIG. 7, by the processing at S31 and S34, the server tank 6W transitions from the state S2 to a state S3. In this case, the server remaining amount increases from the remaining amount V3 by an amount V4. In this way, in the state S3, the server remaining amount becomes a remaining amount V6. At S33, the CPU 51 determines that the server remaining amount acquired by the processing at S32 has reached the pre-circulation remaining amount stored by the processing at S23, but as described above, the actual server remaining amount may be different from the pre-circulation remaining amount. For example, at S32, at a time point at which the server sensor 71 that is detecting the returning white ink detects that the server remaining amount is the pre-circulation remaining amount, since the oscillation is occurring in the white ink inside the server tank 6W, the actual server remaining amount may be less than the pre-circulation remaining amount. In the state S3, as a difference between the remaining amount V1 and the remaining amount V6, an amount V7 indicates a circulation change amount.

The circulation change amount is an absolute value of an amount by which the server remaining amount changes from before to after the circulation processing shown in FIG. 5. In the present embodiment, it is presumed that the circulation change amount (that is, the amount V7) is specified in advance as a result of experimentation, trial operation, and the like, and, as shown in FIG. 7, for example, it is presumed that the actual server remaining amount decreases by the circulation change amount from before to after the circulation processing shown in FIG. 5. In other words, in the circulation processing shown in FIG. 5, it is presumed that the actual amount V4 of the white ink returned from the printer tank 17W of the printer 1A to the server tank 6W by the return operation by the processing at S31 is less, by the circulation change amount V7, than the actual amount V2 of the white ink supplied from the server tank 6W to the printer tank 17W of the printer 1A by the supply operation by the processing at S24.

<Correction Processing>

Figure 6:
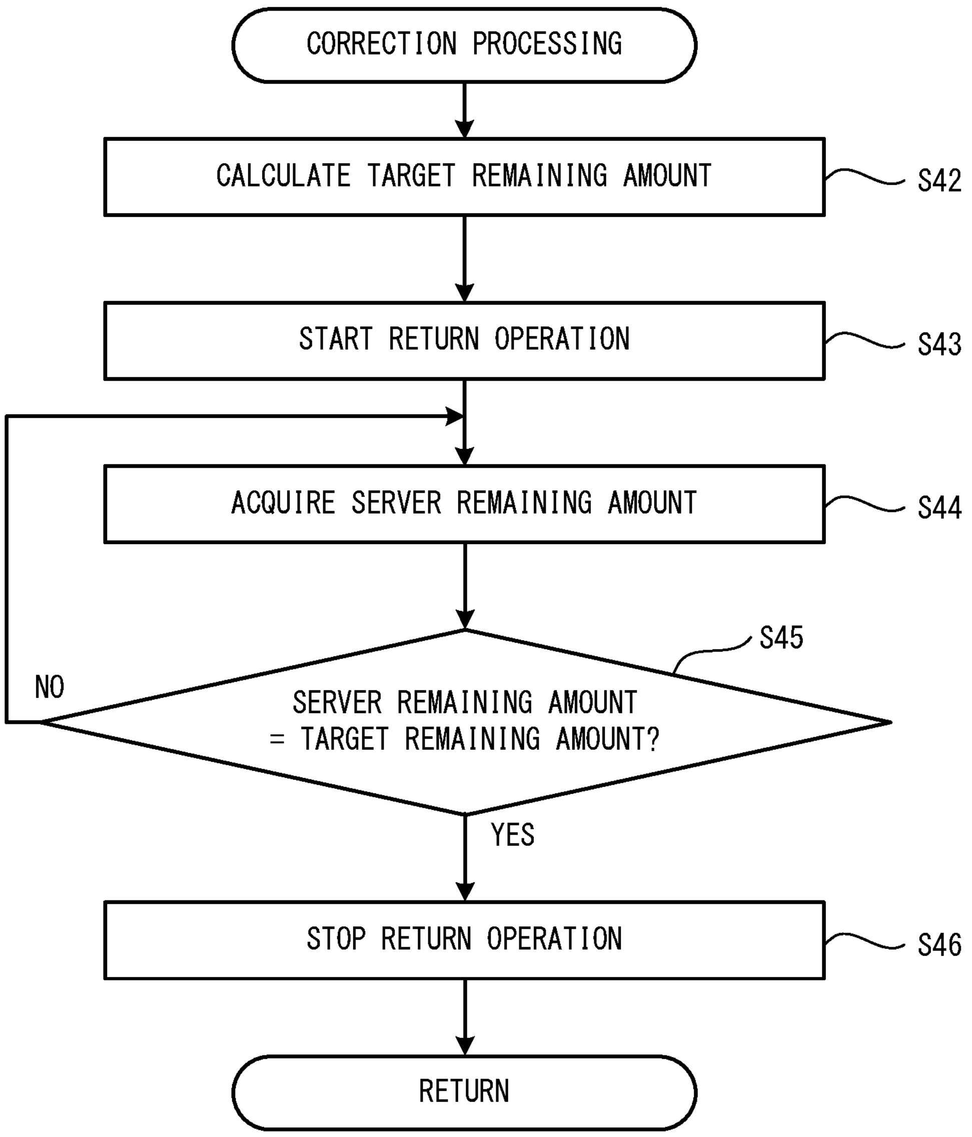
FIG. 6 is a flowchart of correction processing.

As shown in FIG. 6, when the correction processing is started, the CPU 51 calculates a target remaining amount, based on the pre-circulation remaining amount stored by the processing at S23 shown in FIG. 5, and on a correction amount (S42). In the present embodiment, the target remaining amount is a sum of the pre-circulation remaining amount and the correction amount. The correction amount is less than two times the circulation change amount, and is an amount equal to or less than the circulation change amount, for example. In the present embodiment, the correction amount is a value determined in advance, and is stored in advance in the flash memory 54, for example.

The CPU 51 starts the return operation (S43). The processing at S43 is the same as the processing at S31 shown in FIG. 5 and a description thereof is thus omitted here. The CPU 51 acquires the server remaining amount from the server sensor 71 shown in FIG. 3 (S44). The CPU 51 determines whether or not the server remaining amount acquired by the processing at S44 has reached the target remaining amount calculated by the processing at S42 (S45).

When the server remaining amount is less than the target remaining amount (no at S45), the CPU 51 returns the processing to S44. When the server remaining amount has reached the target remaining amount (yes at S45), the CPU 51 stops the return operation (S46). The processing at S46 is the same as the processing at S34 shown in FIG. 5 and a description thereof is thus omitted here. The CPU 51 returns the processing to the main processing shown in FIG. 4.

As shown in FIG. 7, by the processing at S43 and S45, the server tank 6W transitions from the state S3 to a state S4. In this case, the server remaining amount increases from the remaining amount V6 by an amount V8 corresponding to the correction amount. In this way, in the state S4, the server remaining amount becomes a remaining amount V9 (the target remaining amount).

Effects of Embodiment

In the above-described embodiment, the liquid supply system 100 supplies the white ink to the printer tank 17W provided in the printer 1. The tube 8 connects the printer tank 17W and the server tank 6W storing the white ink. The supply pumps 20 and 21, the supply valves 22 and 23, the circulation pumps 26 and 27, and the circulation valves 28 and 29 (hereinafter referred to as a "liquid delivery mechanism") are provided in the tube 8, and perform the supply operation of supplying the white ink from the server tank 6W to the printer tank 17W via the tube 8, and the return operation of returning the white ink from the printer tank 17W to the server tank 6W via the tube 8. In the circulation processing (S16), the CPU 51 causes the liquid delivery mechanism to perform the supply operation and the return operation. In the correction processing (S17), the CPU 51 causes the liquid delivery mechanism to perform one of the return operation or the supply operation (the return operation in the above-described embodiment). In the correction processing (S17), the CPU 51 delivers the white ink corresponding to the correction amount, which is the amount less than two times the pre-circulation remaining amount by which the server remaining amount changes from before to after the circulation processing, from the printer tank 17W in which the remaining amount of the white ink has increased from before to after the circulation processing, to the server tank 6W in which the remaining amount of the white ink has decreased from before to after the circulation processing.

According to this configuration, since the correction amount is less than two times the amount of the pre-circulation remaining amount, a change amount of the server remaining amount from the server remaining amount before the processing that includes the circulation processing and the correction processing to the server remaining amount after the processing including the circulation processing and the correction processing is less than the circulation change amount. More specifically, as shown in FIG. 7, since the correction amount is less than two times the amount of the circulation change amount, the difference between the remaining amount V1 and the remaining amount V9 is less than the amount V7 (that is, the circulation change amount), which is the difference between the remaining amount V1 and the remaining amount V6. For example, if the amount V8 is the same as the circulation change amount, in the state S4, the remaining amount V9 is the same as the remaining amount V1. Thus, the CPU 51 contributes to causing the actual server remaining amount after the circulation operation to be closer to the server remaining amount before the circulation operation.

The greater the correction amount, the longer it takes to deliver the white ink from the printer tank 17W to the server tank 6W in the correction processing. In the above-described embodiment, in the correction processing, the CPU 51 delivers the white ink corresponding to the correction amount equal to or less than the circulation change amount from the printer tank 17W to the server tank 6W. According to this configuration, the CPU 51 contributes to shortening a time period required for the correction processing, compared to a case in which the correction amount is greater than the circulation change amount.

In the correction processing, the CPU 51 delivers, from the printer tank 17W to the server tank 6W, the white ink corresponding to the correction amount that is determined in advance. According to this configuration, in the correction processing, the correction amount is not calculated each time the correction processing is performed, and the white ink of the constant amount is delivered from the printer tank 17W to the server tank 6W. Thus, the CPU 51 contributes to causing the actual server remaining amount after the circulation operation to be closer to the server remaining amount before the circulation operation, using a simple control.

In the circulation processing, the CPU 51 causes the liquid delivery mechanism to perform the supply operation and the return operation based on the signal from the server sensor 71 that is provided in the server tank 6W and that detects the server remaining amount. The agitation mechanism 96 is provided in the server tank 6W in which the server sensor 71 is provided, and agitates the white ink inside the server tank 6W. The CPU 51 controls the operation of the agitation mechanism 96 in the processing at S10, S15, and S18. When the circulation processing is to be performed (yes at S14), the CPU 51 stops the agitation operation of the agitation mechanism 96 (S15). According to this configuration, by stopping the agitation operation by the agitation mechanism 96, the oscillation of the white ink inside the server tank 6W decreases. In this way, the error between the server remaining amount detected by the server sensor 71 and the actual server remaining amount becomes less. As a result, in the circulation processing, the CPU 51 contributes to accurately controlling the liquid delivery mechanism based on the signal from the server sensor 71.

Modified Examples

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below. Modified examples described below may be combined with each other as appropriate insofar as no contradictions arise. The CPU 51 may perform correction processing shown in FIG. 8, in place of the correction processing shown in FIG. 6.

Figure 8:
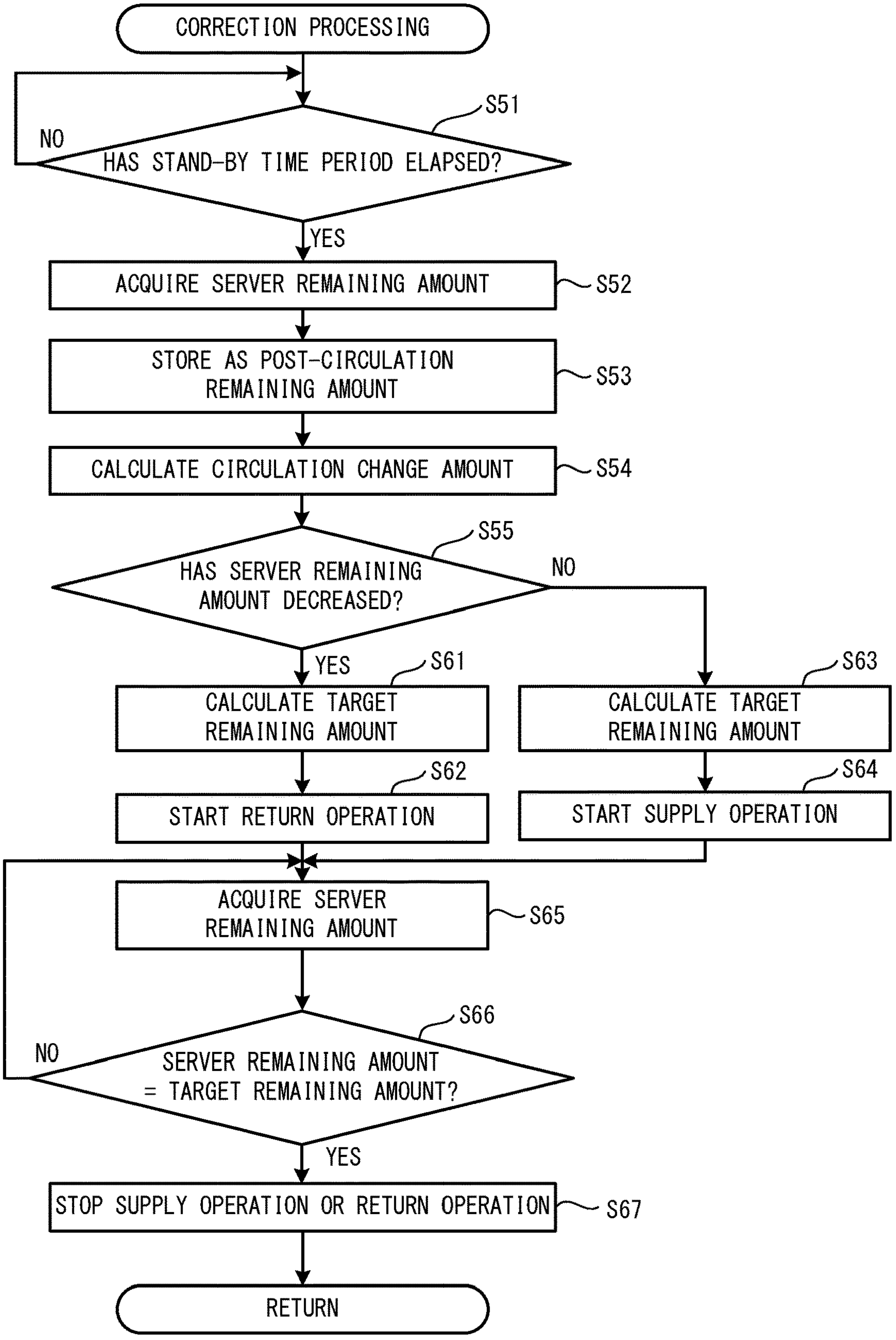
FIG. 8 is a flowchart of correction processing.

As shown in FIG. 8, when the correction processing is started, the CPU 51 refers to the timer counter of the RAM 53, and determines whether or not a stand-by time period that is determined in advance has elapsed (S51). The stand-by time period is a time period up to the acquisition of the server remaining amount at S52 to be described later, after the circulation processing (S16) shown in FIG. 4, and is stored in advance in the flash memory 54, for example. "After the circulation processing" means after the return operation by the processing at S34 shown in FIG. 5 has been stopped.

When the stand-by time period has not elapsed (no at S51), the CPU 51 repeats the processing at S51 until the stand-by time period has elapsed. When the stand-by time period has elapsed (yes at S51), the CPU 51 acquires the server remaining amount from the server sensor 71 shown in FIG. 3 (S52). In accordance with the elapse of the time period, the oscillation of the white ink inside the server tank 6W decreases. Thus, when the server remaining amount is acquired from the server sensor 71 after the stand-by time period has elapsed, the error between the acquired server remaining amount and the actual server remaining amount becomes less, compared to a case in which the server remaining amount is acquired from the server sensor 71 immediately after the circulation processing. Note that the CPU 51 may omit the processing at S51. In other words, the CPU 51 may acquire the server remaining amount from the server sensor 71 immediately after the circulation processing.

The CPU 51 stores the server remaining amount acquired by the processing at S52 in the RAM 53 as a post-circulation remaining amount (S53). The post-circulation remaining amount is the server remaining amount after the circulation processing (S16) shown in FIG. 4 and before the correction processing. The CPU 51 calculates the circulation change amount based on the pre-circulation remaining amount stored by the processing at S23 shown in FIG. 5 and on the post-circulation remaining amount stored by the processing at S53 (S54). The circulation change amount is a value obtained by subtracting the pre-circulation remaining amount from the post-circulation remaining amount. In the correction processing shown in FIG. 8, the absolute value of the circulation change amount is the correction amount. Note that the CPU 51 may calculate the correction amount based on the circulation change amount calculated by the processing at S54. For example, the CPU 51 may use the absolute value of a predetermined ratio of the circulation change amount as the correction amount.

Based on the circulation change amount calculated by the processing at S54, the CPU 51 determines whether or not the server remaining amount has decreased from before the circulation processing (S16) shown in FIG. 4 to after the circulation processing (S55). When the circulation change amount is a negative value, the CPU 51 determines that the server remaining amount has decreased (yes at S55). In this case, the CPU 51 calculates the target remaining amount based on the post-circulation remaining amount stored by the processing at S53 and on the circulation change amount (the correction amount) calculated by the processing at S54 (S61). The target remaining amount at S61 is a sum of the post-circulation remaining amount and the correction amount. The CPU 51 starts the return operation (S62). The processing at S62 is the same as the processing at S31 shown in FIG. 5 and a description thereof is thus omitted here. The CPU 51 shifts the processing to S65.

When the circulation change amount is a positive value, the CPU 51 determines that the server remaining amount has increased (no at S55). In this case, the CPU 51 calculates the target remaining amount based on the post-circulation remaining amount stored by the processing at S53 and on the circulation change amount (the correction amount) calculated by the processing at S54 (S63). The target remaining amount at S63 is a difference between the post-circulation remaining amount and the correction amount. The CPU 51 starts the supply operation (S64). The processing at S64 is the same as the processing at S24 shown in FIG. 5 and a description thereof is thus omitted here. The CPU 51 shifts the processing to S65.

The CPU 51 performs processing at S65 and processing at S66. The processing at S65 and the processing at S66 are the same, respectively, as the processing at S44 and the processing at S45 shown in FIG. 6 and a description thereof is thus omitted here. When the server remaining amount has reached the target remaining amount (yes at S66), the CPU 51 stops the return operation started by the processing at S62 or the supply operation started by the processing at S64 (S67). The CPU 51 returns the processing to the main processing shown in FIG. 4. Although not shown in the drawings, in the processing at S55, when the circulation change amount is "zero," the CPU 51 may return the processing to the main processing shown in FIG. 4.

An example of operational effects by the correction processing shown in FIG. 8 will be described. Hereinafter, of the server tank 6W and the printer tank 17W, the tank in which the white ink has increased from before to after the circulation processing will be referred to as a "tank of increase." Of the server tank 6W and the printer tank 17W, the tank in which the white ink has decreased from before to after the circulation processing will be referred to as a "tank of decrease."

When the circulation processing is to be performed, in the processing at S54, the CPU 51 calculates the circulation change amount based on the signal from the server sensor 71 that is provided in the server tank 6W and that detects the server remaining amount. In the correction processing, the CPU 51 delivers the white ink corresponding to the correction amount based on the calculated correction amount, from the tank of increase to the tank of decrease. According to this configuration, even if the circulation change amount of the first circulation processing and the circulation change amount of the second circulation processing are different amounts, the correction amount corresponding to each of the circulation change amounts is delivered from the tank of increase to the tank of decrease. Thus, the CPU 51 contributes to causing the actual server remaining amount of the white ink in the tank after the circulation operation to be closer to the server remaining amount of the white ink in the tank before the circulation operation, even when the circulation change amount has changed.

In the processing at S54, when the stand-by time period has elapsed after the circulation processing (yes at S51), the CPU 51 calculates the circulation change amount based on the signal from the server sensor 71. According to this configuration, when the predetermined time period elapses after the circulation processing, the oscillation of the white ink in the server tank 6W due to the circulation processing decreases. When the oscillation of the white ink in the server tank 6W decreases, the detection accuracy of the server sensor 71 is likely to be higher, compared to a case in which the oscillation of the white ink in the server tank 6W is larger. Thus, the CPU 51 contributes to accurately calculating the circulation change amount.

Other modified examples will be described. The CPU 51 may change the timing of re-starting the agitation operation. For example, the CPU 51 may re-start the agitation operation after the circulation processing (S16) and before the correction processing (S17). The CPU 51 may change the timing of stopping the agitation operation. For example, the CPU 51 may stop the agitation operation after stopping the supply operation (S26), and before starting the return operation (S31).

In the processing at S15, the CPU 51 need not necessarily stop the agitation operation. For example, the CPU 51 may lower a rotation speed of the agitation motor 963. In other words, the CPU 51 may lower an agitation speed by the agitation mechanism 96. The agitation mechanism 96 is not limited to being the propeller stirrer, and may be a magnetic stirrer, an ultrasonic stirrer, or the like.

When the circulation interval has elapsed (yes at S41), the CPU 51 may perform the correction processing shown in FIG. 5 before the circulation processing (S16) shown in FIG. 4. In this case, in the processing at S42, the CPU 51 may acquire the server remaining amount from the server sensor 71, and may calculate the target remaining amount based on the acquired server remaining amount and the correction amount. In this case, the target remaining amount is a sum of the server remaining amount before the correction processing and the correction amount.

In the circulation processing, the CPU 51 may change an execution order of the supply operation (S24 and S26) and the return operation (S31 and S34). For example, the CPU 51 may perform the supply operation after performing the return operation. The CPU 51 may perform the supply operation and the return operation in parallel with each other. The CPU 51 may alternately repeat the supply operation and the return operation.

In the above-described embodiment, when the supply time period has elapsed (yes at S25), the CPU 51 stops the supply operation (S26). In contrast to this, the CPU 51 may stop the supply operation based on an integrated number of rotations of the supply pumps 20 and 21 from when the supply operation is started by the processing at S24, on a change amount of the server remaining amount from when the supply operation is started by the processing at S24, or the like.

In the above-described embodiment, when the server remaining amount has reached the pre-circulation remaining amount (yes at S33), the CPU 51 stops the return operation (S34). In contrast to this, the CPU 51 may stop the return operation based on an integrated number of rotations of the circulation pumps 26 and 27 from when the return operation is started by the processing at S31, on a change amount of the server remaining amount from when the return operation is started by the processing at S31, or the like.

In the above-described embodiment, when the server remaining amount has reached the target remaining amount (yes at S45), the CPU 51 stops the return operation (S46). In contrast to this, the CPU 51 may stop the return operation based on an integrated number of rotations of the circulation pumps 26 and 27 from when the return operation is started by the processing at S43, on a change amount of the server remaining amount from when the return operation is started by the processing at S43, or the like.

In the processing at S13, S33, S45, and the like, the CPU 51 determines a respective determination content based on the server remaining amount. In contrast to this, in the processing at S13, S33, S45, and the like, the CPU 51 may determine the respective determination content based on the printer remaining amount. In this case, the CPU 51 may acquire the printer remaining amount from the printer sensor 185 of each of the printers 1. When the respective determination content is determined based on the printer remaining amount, in the processing at S15, the CPU 51 need not necessarily stop the agitation operation by the agitation mechanism 96.

In the printer tank 17W, an agitation mechanism may be provided for agitating the white ink in the printer tank 17W. In this case, when the respective determination content is determined based on the printer remaining amount, in the processing at S15, the CPU 51 may lower an agitation speed by the agitation mechanism provided in the printer tank 17W or may stop the agitation operation by the agitation mechanism provided in the printer tank 17W.

In the above-described embodiment, the actual server remaining amount decreases by the circulation change amount from before to after the circulation processing (S16). In contrast to this, the actual server remaining amount may increase by the circulation change amount from before to after the circulation processing (S16). In this case, in the processing at S42, the CPU 51 may calculate the target remaining amount as the difference between the pre-circulation remaining amount and the correction amount, and, in the processing at S43, may start the supply operation.

Hereinafter, an amount per unit time of the white ink flowing via the tube 8 between the server tank 6W and the printer tank 17W will be referred to as a "unit flow rate." The unit flow rate in the return operation in the correction processing may be less than the unit flow rate of the supply operation and the return operation in the circulation processing. For example, the CPU 51 controls each of the pump motors 201, 211, 261, and 271 such that a rotation speed (rpm) of the pump motors 201, 211, 261, and 271 in the processing at S24 to S26 and S31 to S34 is a first rotation speed. In this case, in the processing at S33, the CPU 51 may determine whether or not the server remaining amount has reached a targeted remaining amount that is based on the pre-circulation remaining amount. The targeted remaining amount may be the same as the pre-circulation remaining amount, may be greater by a predetermined amount than the pre-circulation remaining amount, or may be less by a predetermined amount than the pre-circulation remaining amount. Note that, similarly to the above-described embodiment, the CPU 51 may determine, in the processing at S33, whether or not the server remaining amount has reached the targeted remaining amount based on the pre-circulation remaining amount.

The CPU 51 controls each of the pump motors 261 and 271 such that the rotation speed (rpm) of the pump motors 261 and 271 in the processing at S43 to S46 is a second rotation speed lower than the first rotation speed. Note that, in the correction processing, when the supply operation is performed, the CPU 51 may control each of the pump motors 201 and 211 such that the rotation speed (rpm) of the pump motors 201 and 211 in the processing at S43 to S46 is the second rotation speed lower than the first rotation speed.

Figure 9:
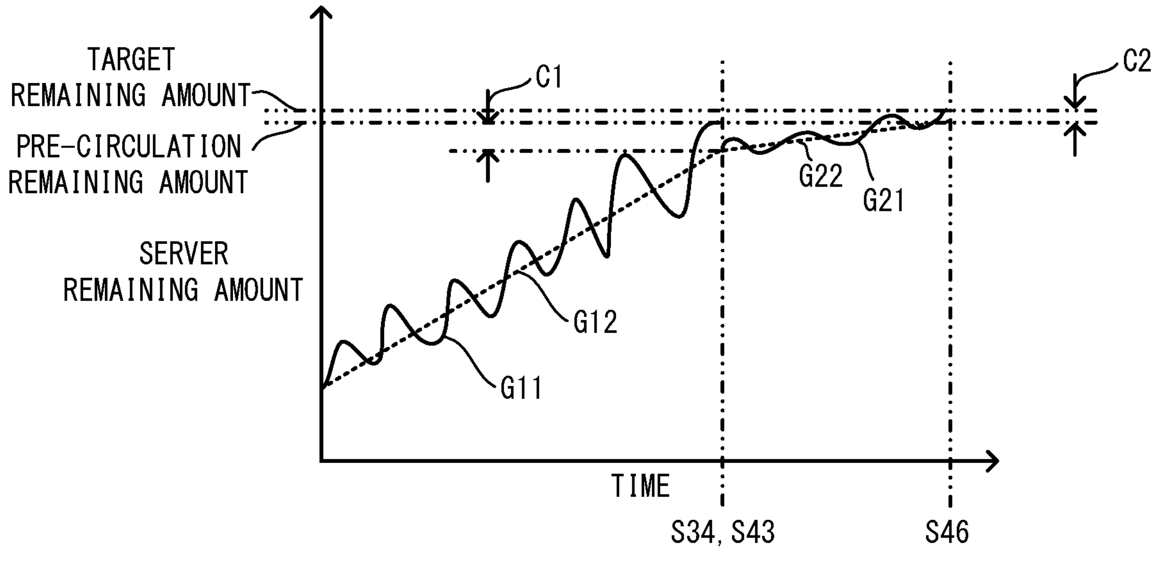
FIG. 9 is a graph showing a server remaining amount over time.

With reference to FIG. 9, main operational effects will be described when the unit flow rate of the return operation in the correction processing is less than the unit flow rate of the supply operation and the return operation in the circulation processing. In FIG. 9, solid line graphs G11 and G21 represent the server remaining amount indicated by the signal of the server sensor 71, and broken line graphs G12 and G22 represent the actual server remaining amount.

In order to shorten a processing time of the circulation processing, for example, in the circulation processing, the unit flow rate may be relatively increased by increasing the rotation speeds of the pump motors 201, 211, 261, and 271. In this case, an amount of the white ink flowing from one to the other of the server tank 6W and the tube 8 increases after the circulation processing, and an amount of white ink flowing from one to the other of the printer tank 17W and the tube 8 increases after the circulation processing. Furthermore, the oscillation of the white ink inside the server tank 6W becomes relatively large.

Until a time point (S34) at which the return operation ends in the circulation processing, the unit flow rate is relatively large, and thus, an error C1 between the actual server remaining amount and the server remaining amount indicated by the signal of the server sensor 71 is relatively large. On the other hand, from a time point (S43) at which the return operation starts in the correction processing to a time point (S46) at which the return operation ends in the correction processing, the unit flow rate is relatively little, and thus, an error C2 between the actual server remaining amount and the server remaining amount indicated by the signal of the server sensor 71 becomes less than the error C1. In this way, the CPU 51 contributes to improving the detection accuracy of the server sensor 71 in the correction processing, while shortening the processing time of the circulation processing. Since the detection accuracy of the server sensor 71 is improved, in the correction processing, the CPU 51 contributes to causing the amount of the white ink actually delivered from the printer tank 17W to the server tank 6W to be closer to the correction amount.

In the above-described embodiment, a plurality of values may be stored in the flash memory 54 as the correction amounts. In this case, for example, a user may set one of the plurality of correction amounts. The CPU 51 may perform the correction processing based on the set correction amount. When a flow path configuration of the white ink is changed, or the like, the circulation change amount may change. In this case also, the CPU 51 performs the correction processing based on the correction amount corresponding to the circulation change amount after the change. Thus, the CPU 51 contributes to causing the actual server remaining amount after the circulation operation to be closer to the server remaining amount before the circulation operation even if the circulation change amount changes.

For example, in the first white flow path W1, the liquid supply device 2 may omit one or both of the supply pumps 20 and 21. For example, when both the supply pumps 20 and 21 are omitted, the CPU 51 controls one or both of the supply valves 22 and 23 to be in the open state and the closed state. In this way, the CPU 51 may control the supply of the white ink to the respective printer tanks 17W of the printers 1A and 1B from the server tank 6W using the liquid head difference between the respective printer tanks 17W of the printers 1A and 1B and the server tank 6W.

For example, in the first white flow path W1, the liquid supply device 2 may omit one or both of the circulation pumps 26 and 27. For example, when both the circulation pumps 26 and 27 are omitted, the CPU 51 controls one or both of the circulation valves 28 and 29 to be in the open state and the closed state. In this way, the CPU 51 may control the return of the white ink from the respective printer tanks 17W of the printers 1A and 1B to the server tank 6W using the liquid head difference between the respective printer tanks 17W of the printers 1A and 1B and the server tank 6W.

For example, in the first white flow path W1, the liquid supply device 2 may omit one or both of the supply valves 22 and 23. In the first white flow path W1, the liquid supply device 2 may omit one or both of the circulation valves 28 and 29. In the first white flow path W1, the liquid supply device 2 may omit one or both of the filters 24 and 25.

In the tube 82, for example, the liquid supply device 2 may change an upstream or downstream positional relationship in the supply flow path of the supply pump 20, the supply valve 22, and the filter 24, as appropriate. Similarly, in the tube 83, for example, the liquid supply device 2 may change an upstream or downstream positional relationship in the supply flow path of the supply pump 21, the supply valve 23, and the filter 25, as appropriate.

In the tube 84, for example, the liquid supply device 2 may change an upstream or downstream positional relationship in the circulation flow path of the circulation pump 26 and the circulation valve 28, as appropriate. Similarly, in the tube 85, for example, the liquid supply device 2 may change an upstream or downstream positional relationship in the circulation flow path of the circulation pump 27 and the circulation valve 29, as appropriate.

The single printer 1 may be connected to the single liquid supply device 2 by the tube 8. The liquid supply device 2 may be provided with only the server tank 6W of the plurality of server tanks, and need not necessarily be provided with the other server tanks. In this case, the printer 1 may be provided with only the printer tank 17W for example, of the plurality of printer tanks, and need not necessarily be provided with the other printer tanks. The printer 1 need not necessarily be provided with the other heads.

The liquid supply system 100 may supply a pre-treatment agent, a post-treatment agent, or water, as the liquid, to each of the plurality of printers 1 from the liquid supply device 2. For example, the water may be used for humidifying the atmosphere inside the printer 1. In this case, the plurality of printers 1 may be respectively provided with a humidifier. The humidifier is provided inside the printer 1 and humidifies the atmosphere inside the printer 1. The tube 8 may connect the server tank storing the water and a tank of the humidifier with each other. The main processing may be applied to a flow path of the water instead of, or in addition to, the first white flow path W1 and the second white flow path W2. Similarly, the main processing may be applied to a flow path of the color inks, the pre-treatment agent, or the post-treatment agent, for example.

The configuration of the printer 1 is not limited to that of the above-described embodiment. For example, in the above-described embodiment, the printer 1 may be a type different from the inkjet printer, and may be a laser printer, a tape printer, or the like. The plurality of heads 14 are not limited to the inkjet heads, and may be thermal heads, or the like. The head 14 and the other heads may be a line head. For example, the printer 1 need not necessarily use ink as the liquid, and it is sufficient that the printer 1 be provided with the humidifier. In this case, the liquid supply system 100 supplies the water from the liquid supply device 2 to the humidifier of the printer 1 via the tube 8.

The server sensor 71 may be an optical sensor or an electrode-type level sensor. In this case, the server sensor 71 may detect the server remaining amount by detecting a height of the liquid surface inside the server tank 6W. The server sensor 71 may be a pressure sensor. In this case, the server sensor 71 may detect the server remaining amount by detecting the pressure inside the server tank 6W.

The printer sensor 185 may be a weight sensor. In this case, the printer sensor 185 may detect the printer remaining amount by detecting the weight of the printer remaining amount. The printer sensor 185 may be an optical sensor or an electrode-type level sensor. In this case, the printer sensor 185 may detect the printer remaining amount by detecting a height of the liquid surface inside the printer tank 17W.

A configuration of the number of the tubes 8, a branching format and the like are not limited to those of the above-described embodiment. For example, the server tank 6W may be connected to the printer tank 17W of the single printer 1 via a plurality of (2, for example) the tubes 8 that do not branch. In this case, in the supply operation and the return operation, the white ink flows through each of the different tubes 8. For example, the tube 84 need not necessarily be connected to the tube 82 at the point P2, and may be directly connected to the server tank 6W of the printer 1A. The tube 85 need not necessarily be connected to the tube 84 at the point P4, and may be directly connected to the server tank 6W. The server tank 6W and the printer tank 17W of the single printer 1 may be connected by the single tube 8 that does not branch. In this case, in each of the supply operation and the return operation, the white ink flows through the same tube 8.

In the above-described embodiment, the liquid supply system 100 may change each of execution conditions for the supply processing and execution conditions for the circulation processing. For example, the CPU 51 may execute the supply processing or the circulation processing when the user operates the operation portion 186 or the operation portion 57, and inputs an instruction to execute the supply processing or the circulation processing to the printer 1 or the liquid supply device 2. The CPU 51 may perform the circulation processing at a time determined in advance.

In the above-described embodiment, the liquid supply system 100 may omit the server sensor 71 and the printer sensor 185. In this case, the CPU 51 may store the server remaining amount and the printer remaining amount of an initial state, for example. Furthermore, by performing time control of the pump motors 201, 211, 261, and 271 using the stored server remaining amount or printer remaining amount as a reference, the CPU 51 may determine a current server remaining amount or printer remaining amount.

The CPU 41 may perform the main processing. In this case, the liquid supply system 100 may omit the CPU 51. The CPU 51 may perform a part of the main processing, and the CPU 41 may perform another part of the main processing. A CPU of an external device may perform the main processing. The external device is a device other than the printer 1 and the liquid supply device 2, and is a personal computer (PC), a smartphone, or the like.

In place of the CPU 41 or 51, a microcomputer, application specific integrated circuits (ASICs), a field programmable gate array (FPGA) or the like may be used as a processor. The main processing may be performed as distributed processing by a plurality of the processors. It is sufficient that the non-transitory storage media, such as the ROM 42 or 52, the flash memory 44 or 54, and the like be a storage medium capable of storing information, regardless of a period of storing the information. The non-transitory storage medium need not necessarily include a transitory storage medium (a transmitted signal, for example). The control program may be downloaded from a server connected to a network (not shown in the drawings) (in other words, may be transmitted as transmission signals), and may be stored in the ROM 42 or 52 or the flash memory 44 or 54. In this case, the control program may be stored in a non-transitory storage medium, such as an HDD provided in the server.

What is claimed is:

1. A liquid supply system supplying a liquid to a printer tank, the printer tank being a tank provided in a printer, the liquid supply system comprising:

a tube connecting the printer tank and a server tank configured to store the liquid;

a liquid delivery mechanism provided in the tube, and being configured to perform a supply operation of supplying the liquid from the server tank to the printer tank via the tube, and a return operation of returning the liquid from the printer tank to the server tank via the tube;

a processor; and a memory storing computer-readable instructions that, when executed by the processor, cause the processor to perform processes comprising:

circulation processing of causing the liquid delivery mechanism to perform the supply operation and the return operation; and correction processing of causing the liquid delivery mechanism to perform one of the supply operation or the return operation, the correction processing delivering the liquid of a correction amount from a tank of increase to a tank of decrease, the correction amount being less than two times a circulation change amount, the circulation change amount being an amount of change in a remaining amount of the liquid in the server tank or the printer tank from before to after the circulation processing, the tank of increase being a tank, of the server tank and the printer tank, in which the remaining amount of the liquid increases from before to after the circulation processing, and the tank of decrease being a tank, of the server tank and the printer tank, in which the remaining amount of the liquid decreases from before to after the circulation processing.

2. The liquid supply system according to claim 1, wherein the computer-readable instructions cause the processor to perform a process comprising:

the correction processing of delivering the liquid of the correction amount from the tank of increase to the tank of decrease, the correction amount being equal to or less than the circulation change amount.

3. The liquid supply system according to claim 1, wherein the computer-readable instructions instruct the processor to perform a process comprising:

the correction processing of delivering the liquid of the correction amount from the tank of increase to the tank of decrease, the correction amount being determined in advance.

4. The liquid supply system according to claim 1, wherein the computer-readable instructions instruct the processor to perform a process comprising:

the circulation processing of causing the liquid delivery mechanism to perform the supply operation and the return operation based on a signal from a sensor, the sensor being provided in the server tank or the printer tank and being configured to detect the remaining amount of the liquid in the server tank or the printer tank, the liquid supply system further comprises:

an agitator provided in the server tank or the printer tank in which the sensor is provided, the agitator being configured to agitate the liquid inside the server tank or the printer tank, and the computer-readable instructions instruct the processor to perform a process further comprising:

agitation control processing of controlling an operation of the agitator, the agitation control processing reducing an agitation speed by the agitator or stopping the operation of the agitator, when the circulation processing is to be performed.

5. The liquid supply system according to claim 1, wherein the computer-readable instructions instruct the processor to perform processes further comprising:

calculation processing of, when the circulation processing has been performed, calculating the circulation change amount based on a signal from a sensor, the sensor being provided in the server tank or the printer tank and being configured to detect the remaining amount of the liquid in the server tank or the printer tank, and the correction processing of delivering, from the tank of increase to the tank of decrease, the liquid of the correction amount based on the circulation change amount calculated by the calculation processing.

6. The liquid supply system according to claim 5, wherein the computer-readable instructions instruct the processor to perform a process comprising:

the calculation processing of calculating the circulation change amount based on the signal from the sensor, when a predetermined time period has elapsed after the circulation processing.

7. The liquid supply system according to claim 5, wherein the computer-readable instructions instruct the processor to perform processes further comprising:

storage processing of, before the circulation processing, storing, based on the signal from the sensor, the remaining amount of the liquid in the server tank or the printer tank as a pre-circulation remaining amount, the circulation processing of causing the liquid delivery mechanism to perform the supply operation and the return operation, based on the signal from the sensor, to cause an amount of a unit flow rate of the liquid flowing between the server tank and the printer tank via the tube to be a first amount, until the remaining amount of the liquid in the server tank or the printer tank reaches a targeted remaining amount, the targeted remaining amount being based on the pre-circulation remaining amount stored by the storage processing, and the correction processing of causing the liquid delivery mechanism to perform one of the supply operation or the return operation to cause the amount of the unit flow rate of the liquid flowing between the server tank and the printer tank via the tube to be a second amount less than the first amount.

8. A control method by a liquid supply system supplying a liquid to a printer tank, the printer tank being a tank provided in a printer, the liquid supply system including a tube and a liquid delivery mechanism, the tube connecting the printer tank and a server tank configured to store the liquid, the liquid delivery mechanism being provided in the tube, the liquid delivery mechanism being configured to perform a supply operation of supplying the liquid from the server tank to the printer tank via the tube, and a return operation of returning the liquid from the printer tank to the server tank via the tube, the control method comprising:

circulation processing of causing the liquid delivery mechanism to perform the supply operation and the return operation; and correction processing of causing the liquid delivery mechanism to perform one of the supply operation or the return operation, the correction processing delivering the liquid of a correction amount from a tank of increase to a tank of decrease, the correction amount being less than two times a circulation change amount, the circulation change amount being an amount of change in a remaining amount of the liquid in the server tank or the printer tank from before to after the circulation processing, the tank of increase being a tank, of the server tank and the printer tank, in which the remaining amount of the liquid increases from before to after the circulation processing, and the tank of decrease being a tank, of the server tank and the printer tank, in which the remaining amount of the liquid decreases from before to after the circulation processing.

9. A non-transitory computer-readable medium storing computer-readable instructions executed by a computer of a liquid supply system supplying a liquid to a printer tank, the printer tank being a tank provided in a printer, the liquid supply system including a tube and a liquid delivery mechanism, the tube connecting the printer tank and a server tank configured to store the liquid, the liquid delivery mechanism being provided in the tube, the liquid delivery mechanism being configured to perform a supply operation of supplying the liquid from the server tank to the printer tank via the tube, and a return operation of returning the liquid from the printer tank to the server tank via the tube, the instructions, when executed by the computer, causing the computer to perform processes comprising:

circulation processing of causing the liquid delivery mechanism to perform the supply operation and the return operation; and correction processing of causing the liquid delivery mechanism to perform one of the supply operation or the return operation, the correction processing delivering the liquid of a correction amount from a tank of increase to a tank of decrease, the correction amount being less than two times a circulation change amount, the circulation change amount being an amount of change in a remaining amount of the liquid in the server tank or the printer tank from before to after the circulation processing, the tank of increase being a tank, of the server tank and the printer tank, in which the remaining amount of the liquid increases from before to after the circulation processing, and the tank of decrease being a tank, of the server tank and the printer tank, in which the remaining amount of the liquid decreases from before to after the circulation processing.

10. A liquid supply device supplying a liquid to a printer tank, the printer tank being a tank provided in a printer, the liquid supply device comprising:

a tube connecting the printer tank and a server tank configured to store the liquid;

a liquid delivery mechanism being a mechanism provided in the tube, and being configured to perform a supply operation of supplying the liquid from the server tank to the printer tank via the tube, and a return operation of returning the liquid from the printer tank to the server tank via the tube;

a processor; and a memory storing computer-readable instructions that, when executed by the processor, cause the processor to perform processes comprising:

circulation processing of causing the liquid delivery mechanism to perform the supply operation and the return operation; and correction processing of causing the liquid delivery mechanism to perform one of the supply operation or the return operation, the correction processing delivering the liquid of a correction amount from a tank of increase to a tank of decrease, the correction amount being less than two times a circulation change amount, the circulation change amount being an amount of change in a remaining amount of the liquid in the server tank or the printer tank from before to after the circulation processing, the tank of increase being a tank, of the server tank and the printer tank, in which the remaining amount of the liquid increases from before to after the circulation processing, and the tank of decrease being a tank, of the server tank and the printer tank, in which the remaining amount of the liquid decreases from before to after the circulation processing.

* * * * *